United States Patent [19]
Crank et al.

[11] Patent Number: 5,858,449
[45] Date of Patent: Jan. 12, 1999

[54] ISOFLAVONE-ENRICHED SOY PROTEIN PRODUCT AND METHOD FOR ITS MANUFACTURE

[75] Inventors: Donald Lee Crank, 5144 Interlachen Dr., Alexandria, Minn. 56308; Phillip Scott Kerr, Urbandale, Iowa

[73] Assignees: E. I. du Pont de Nemours and Company, Wilmington, Del.; Donald Lee Crank, Alexandria, Minn.

[21] Appl. No.: 913,180
[22] PCT Filed: Apr. 8, 1997
[86] PCT No.: PCT/US97/05724
§ 371 Date: Sep. 9, 1997
§ 102(e) Date: Sep. 9, 1997
[87] PCT Pub. No.: WO97/37547
PCT Pub. Date: Oct. 16, 1997

Related U.S. Application Data

[60] Provisional application No. 60/015,052 Apr. 9, 1996.
[51] Int. Cl.⁶ ..................................................... A23J 1/00
[52] U.S. Cl. .......................... 426/656; 426/634; 426/629; 426/443; 426/431
[58] Field of Search .................................... 426/431, 443, 426/629, 634, 656

[56] References Cited

U.S. PATENT DOCUMENTS 5,352,384 10/1994 Shen ......................................... 252/398
5,702,752 12/1997 Gugger et al. ........................... 426/634
5,763,389  6/1998 Shen et al. ................................. 514/2

FOREIGN PATENT DOCUMENTS 0 479 586 A1  4/1992  European Pat. Off. .
93/07742      4/1993  WIPO .
95/27406     10/1995  WIPO .

OTHER PUBLICATIONS

H. E. Snyder et al., Soybean Utilization, 130–135; 194–199; 202–205; 269–287, 1987.
A. K. Smith et al., Soybeans: Chemistry and Technology, 1, 97–99; 179–182; 356–365, 1972.
H–J. Wang et al., Isoflavone Content in Commercial Soybean Foods, J. Agric. Food Chem., 42, 1666–1673, 1994.
C. Tsukamoto, Factors Affecting Isoflavone Content in Soybean Seeds; Changes in Isoflavones, Saponins, and Composition of Fatty Acids at Different Temperatures during Seed Development, J. Agric, Food Chem., 43, 1184–1192, 1995.
H–J. Wang, Quanitation of potentially anticarcinogenic isoflavones in soy foods and soybeans and the effect of processing on the composition of isoflavones, Database FSTA, Dissertation Abstracts International, 95–1–10–j0131, 55, No. 7, 128.
T. Hymowitz et al., Relationship Between the Content of Oil, Protein, and Sugar in Soybean Seed, Argonomy Journal, 64, 613–616, 1972.
T. Hymowitz et al., Variability of Sugar Content in Seed of Glycine max (L.) Merrill and G. soja Sieb. And Zucc., Agronomy Journal, 66, 239–240, 1974.

Primary Examiner—Nina Bhat

[57] ABSTRACT

This invention relates to a novel isoflavone-enriched soy protein product and a method used for its manufacture. The finished soy protein product displays desirable flavor and functional properties, and its isoflavone content is substantially increased compared to traditional soy protein concentrates and isolates. In addition the total sulfur containing amino acid content is improved compared to soy protein isolates. The method for the manufacture of the novel soy protein product results in improved yield and reduced waste products compared to those used to manufacture soy protein concentrates and isolates. The novel soy protein product displays desirable flavor, composition, and performance as an ingredient in the production of dairy or meat based food products such as infant formula, nutritional beverage, milk replacer, soy extended bologna, imitation processed cheese spread, water-injected ham, yogurt and frozen dessert.

11 Claims, 1 Drawing Sheet

ISOFLAVONE-ENRICHED SOY PROTEIN PRODUCT AND METHOD FOR ITS MANUFACTURE

This application is a 371 of PCT/US97/05724 filed Apr. 8, 1997 which claims benefit of Provisional application 60/015,052 filed Apr. 9, 1996.

FIELD OF THE INVENTION

This invention relates to a novel soy protein product and the method used for its manufacture and, in particular, to a novel isoflavone-enriched soy protein product having desirable flavor and functional properties in which the isoflavone content is substantially increased compared to traditional soy protein concentrates and isolates. In addition, the method for the manufacture of the novel soy protein product results in improved yield and reduced waste products compared to methods used to manufacture traditional soy protein concentrates and isolates. The novel soy protein product displays desirable flavor, composition, and performance as an ingredient in the production of dairy or meat based food products such as infant formula, nutritional beverage, milk replacer, soy extended bologna, imitation processed cheese spread, water-injected ham, yogurt and frozen dessert.

BACKGROUND OF THE INVENTION

Soy protein concentrates and soy protein isolates are important derivatives of soybeans which are used primarily as food and feed ingredients. Conditions typically used to prepare soy protein isolates have been described by [Cho, et al, (1981) U.S. Pat. No. 4,278,597; Goodnight, et al, (1978) U.S. Pat. No. 4,072,670]. Soy protein concentrates are produced by three basic processes: acid leaching (at about pH 4.5), extraction with alcohol (about 55–80%), and denaturing the protein with moist heat prior to extraction with water. Conditions typically used to prepare soy protein concentrates have been described by Pass [(1975) U.S. Pat. No. 3,897,574; Campbell et al., (1985) in New Protein Foods, ed. by Altschul and Wilcke, Academic Press, Vol. 5, Chapter 10, *Seed Storage Proteins*, pp 302–338]. In the production of soy protein isolates and soy protein concentrates, the soluble sugars present in the dehulled, defatted soybean meal contain stachyose and raffinose [Dey, (1985) Biochemistry of Storage Carbohydrates in Green Plants, Academic Press, London, pp 53–129]. Stachyose and raffinose are not digested directly by humans and animals but, rather, by microflora in the lower gut. These microflora are able to ferment these sugars thus resulting in an acidification of the gut and production of carbon dioxide, methane and hydrogen [Murphy (1972) Journal of Agricultural Food Chemicals 20 pp 813–817, Cristofaro 91974) Sugars in Nutrition Chapter 20, pp 313–335, Reddy (1980) Journal of Food Science 45 pp 1161–1164]. The resulting flatulence can severely limit the use of soybeans in human and animal diets. These sugars are removed in the production of soy protein isolates and soy protein concentrates and treated as a waste product of the manufacturing process. This waste represents a minimum of 25% loss of the original dehulled, defatted soy flake raw material. Additionally, the treatment of these wasted sugars is a considerable manufacturing cost factor in the production of soy isolates and concentrates, and the waste processing is an important factor that can limit the location of a factory to produce such products. The incorporation of these sugars into soy isolates or concentrates would significantly reduce production costs, reduce the amount of equipment necessary, and by eliminating waste treatment options the opportunities in site selections for such factories would be improved.

Isoflavones are naturally occurring components of soybeans which are present in soy foods and soy protein isolates and concentrates. It has been suggested that such isoflavones in soy products may have a potential role in the prevention of cancer, Messina and Barnes (1991) Journal of the American Cancer Institute, Vol. 83, No. 8 pages 542–545. It has been suggested that the isoflavone genistein may have some role as a chemopreventive agent against breast and prostate cancer in humans, Peterson and Barnes, 1991, Biochemical and Biophysical Research Communications 179, pp 661–667 and Peterson and Barnes (1993), Prostate 22, pp 335–345. The concentration of isoflavones present in defatted soybean meal is significantly reduced in the production of soy protein isolates and concentrates, and such reduction is significantly dependent on the manufacturing process [Wang and Murphy (1994) Journal of Agricultural and Food Chemistry,42, pages 1665–1673]. Increasing the concentration of isoflavones present in soy protein isolates or concentrates is desirable, but existing commercial processes capture only 3 to 35% of the isoflavones available in the raw material.

Soy protein isolates and concentrates are used in the food industry to replace or extend meat, milk, egg, and other protein sources in traditional food products. The soy proteins are modified to have similar functional performance as the protein being replaced or extended. Some of the major applications where soy protein isolates and concentrates are used include emulsified meats, whole muscle injection meats, ground meats, infant formulas, nutritional beverages, milk replacers, imitation processed cheese spreads, and dairy products. One of the key factors limiting the use of soy protein isolates especially in nutritional beverages, milk replacers, and dairy products is the soy taste present in the isolates. If the traditional soy taste could be masked or reduced, significant increases in soy isolates usage levels in the identified applications would occur. Soy concentrates are not widely used in the applications of nutritional beverages, milk replacers, and dairy products because of the strong soy taste and the presence of soy fiber as an insoluble component with undesirable mouthfeel. Reducing the level or masking the soy taste would allow for limited improvement in usage in these applications as the fiber would remain a significant negative factor.

Commercial manufacturing procedures for soy isolates results in products with lower levels of the sulfur containing amino acids cysteine and methionine when compared to soy concentrates. Cysteine and methionine are essential amino acids which are important nutritional factors in all soy products as well as other products produced from meat, milk or egg proteins.

The development of a process which would produce a soy protein product with an improved carbohydrate profile, increased isoflavone content, improved flavor profile, acceptable mouthfeel, improved nitrogen solubility index, and increased sulfur containing amino acid composition would dramatically increase the utilization of soy protein products as food ingredients. In addition, such a process would significantly improve the cost of production by reduction of operating costs, improvement in raw material conversion, and allowing greater flexibility for manufacturing site selection as well as eliminating waste treatment costs.

SUMMARY OF THE INVENTION

The present invention comprises an isoflavone-enriched soy protein product having:

protein content greater than 60% of total dry matter;

total dietary fiber content less than 4% of total dry matter;

sucrose content greater than 10% of total dry matter;

total sulfur-containing amino acid content greater than 2.2% of total amino acid content;

stachyose content less than 1.5% of total dry matter; and total isoflavone content greater than 2500 micrograms/gram.

In another embodiment, this invention concerns a method for the manufacture of an isoflavone-enriched soy protein product. The method comprises: (a) preparing soyflour or flakes from soybeans wherein the soyflour or flakes have a stachyose content less than 2.0% of total dry matter, a sucrose content greater than 9.0% of total dry matter, and a total isoflavone content greater than 2,000 micrograms/gram of total dry matter; (b) contacting the material from (a) with a solvent to preferentially remove the dietary fiber; (c) collecting the soluble material from (b) by centrifugation or other equivalent physical means; and (d) drying the soluble material from (c) to an appropriate level of moisture to allow for optimum handling and subsequent use of the soy protein product. The novel soy protein products are then used as ingredients in the production of dairy or meat based food products such as infant formula, nutritional beverage, milk replacer, soy extended bologna, imitation processed cheese spread, brine injected ham, yogurt and frozen dessert.

BIOLOGICAL DEPOSIT

Figure 1:
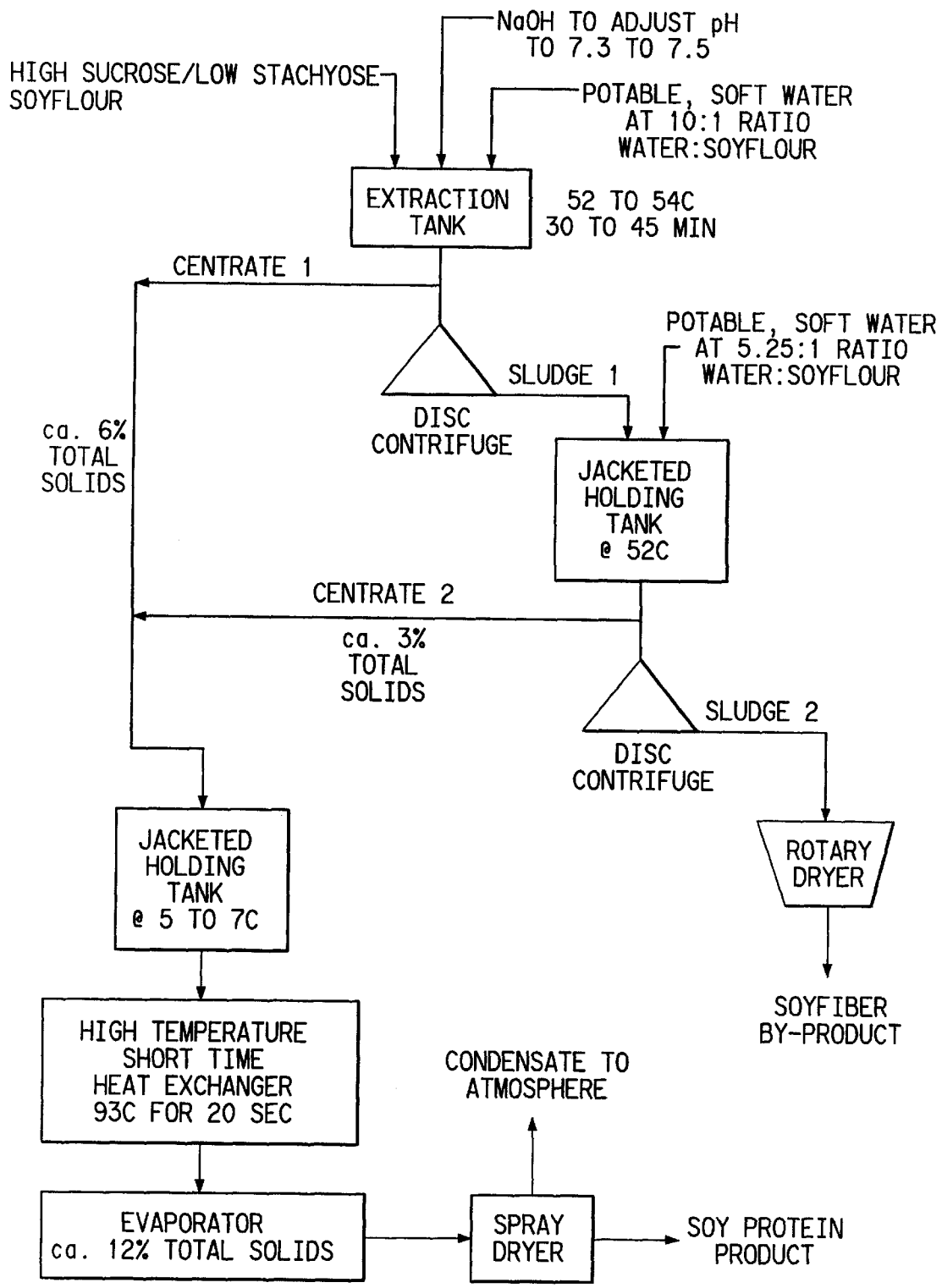
FIG. 1 depicts a generalized representation of one possible embodiment of the invention. High sucrose, low stachyose soy flakes, water, and caustic are mixed in an agitated, heated tank for protein and sugar extraction. Once thoroughly agitated and heated, the mixture is fed to the first centrifugal separation. The liquor goes to a holding tank and the centrate is mixed with water in a separate tank where it is heated and agitated. The mixed centrate is fed to the second centrifugal separation where the liquors are combined, and the centrate is dried as a fiber by-product. The mixed liquors are then pasteurized in a heat exchanger, evaporated to a sufficient solids composition for economical spray drying, and modified before spray drying. In the spray drier, the novel soy protein product is separated from water to provide a powdered finished product.

The following biological materials have been deposited under the terms of the Budapest Treaty At American Type Culture Collection (ATCC), 12301 Parklawn Drive, Rockville, Md. 20852, and bear the following accession numbers:

| Designation | Material | Accession Number | Date of Deposit |
|---|---|---|---|
| DuPont1 | Seed | ATCC97973 | April 4, 1997 |
| DuPont2 | Seed | ATCC97972 | April 4, 1997 |

DETAILED DESCRIPTION OF THE INVENTION

The term "soy protein isolates" as used herein refers to those products which are the major proteinaceous fraction of soybeans prepared from dehulled soybeans by removing the majority of non-protein compounds and must contain not less than 90% protein on a moisture free basis as set forth in (1996) Official Publication of the Association of American Feed Control Officials, Inc.

The term "soy protein concentrates" as used herein refers to those products which are prepared from high quality sound, clean dehulled soybean seeds by removing most of the oil and water soluble non-protein constituents and must contain not less than 65% protein on a moisture free basis as set forth in (1966) Official Publication of the Association of American Feed Control Officials, Inc.

"Yield" is defined as the number of metric tons of finished soy protein product divided by the number of metric tons of soy flakes or flour used to manufacture the finished product. Protein refers to the crude protein content as defined by AOAC 988.05, 16th edition, 1995.

The novel soy protein products are then used as ingredients in the production of dairy or meat based food products such as infant formula, nutritional beverage, milk replacer, soy extended bologna, imitation processed cheese spread, brine injected ham, yogurt and frozen dessert.

"Total dietary fiber" refers to materials defined by AOAC 991.43, 16th edition, 1993.

"NSI" refers to the Nitrogen Solubility Index as defined by American Oil Chemists' Society Method Ac4-41.

"PDI" refers to the Protein Dispersibility Index as defined by American Oil Chemists' Society Method Ba 10-65, 4th edition, 1989. Solubility index refers to the material defined by American Public Health Assn., Standard Methods for Examination of Dairy Products, Solubility index test, 15th edition, 1985.

"White flakes" refers to dehulled, flaked cotyledons that have been defatted and treated with controlled moist heat to have a PDI of about 85 to 90. This term can also refer to a flour with a similar PDI that has been ground to pass through a standard U.S. Standard Screen, typically size No. 100 or No. 200. HPAEC refers to High Performance Anion Exchange chromatography.

Total soluble carbohydrate or total soluble sugars refers to the sum of the stachyose, raffinose, and sucrose content as determined by the HPAEC method as described in the present invention. Total isoflavone content refers to the sum of daidzein, genistein and glycitein isomers, with normalization of molecular weight differences as described in in Wang and Murphy, (1994), *J Agric. Food Chem*, 42: 1666–1673. Daidzein content refers to the sum of the aglycon, glucoside, acetylglucoside, malonylglucoside isomers of daidzein as described in *J Agric. Food Chem*, (1994) Volume 42: pp 1666–1673. Genistein content refers to the sum of the aglycon, glucoside, acetylglucoside, malonylglucoside isomers of genistein as described in Wang and Murphy, (1994), *J Agric. Food Chem*, 42: 1666–1673. Glycitein content refers to the sum of the aglycon, glucoside, acetylglucoside, malonylglucoside isomers of glycitein as described in Wang and Murphy, (1994), *J Agric. Food Chem*, 42: 1666–1673.

Dry basis refers to materials that have 0% moisture. Dry basis measurements are obtained by analyzing materials that have been placed in a 45° C. oven until they have reached constant weight as defined by AOAC 16th edition 934.01. Fat refers to the acid hydrolysis test as defined by the AOAC, 16th edition 922.06 modified. Ash refers to the ash test as defined by the AOAC, 16th edition 950.49. Amino acid profile refers to specific amino acids are determined in [Moore and Stein, (1963), *Methods in Enzymology*, 6:819–822]. Total sulfur amino acid content refers to the sum of the cysteine and methionine content as determined in [Moore and Stein, (1963), *Methods in Enzymology*, 6:819–822].

Total Soluble Carbohydrate Assay

A High Performance Anion Exchange (Chromatographic/Pulsed Electrochemical assay was used for determining the content of stachyose, raffinose and sucrose. For purposes of analysis, 30 to 50 mg of a given sample was weighed into a 13×100 mm culture tube. The tubes were then placed in an oven at 160° C. for 10 min. The tube was then removed from the oven and allowed to cool for at least 10 min. Following cooling, 4.0 mL of deionized water and 1.0 mL of isooctane was added to the tube and the sample was mixed on an orbital shaker for 60 min. The tube was then removed from the shaker and the solvent layers were separated by centrifuging tubes in table top centrifuge for 20 min. at 4,000 rpm. A 100 μL aliquot from the aqueous layer was placed into an autosampler vial and a 1,150 μL aliquot of water was added to the vial. The sample was mixed vigorously for 30 seconds and a 20 μL sample was analyzed by High Performance Anion Exchange Chromatography using a Dionex® PA1 column. Chromatography was carried out at room temperature using 150 mM NaOH as the mobile phase. The flow rate was 1.3 mL/min. The pulsed electrochemical detector was used with the following settings: T0.00=0.05v, T0.20=0.05v, T0.40=0.05v, T0.41=0.75v, T0.60=0.75v, T0.61=−0.15v, T1.00=−0.15v with integration between 0.20 sec and 0.40 sec.

Applications Evaluation Method

The evaluation method herein utilized for the application products produced is a 7-point hedonic scale typically used by professional food and meat scientists in judging food and meat products for competition. The seven point scale is identified below:

| Evaluation Score | Evaluation description |
|---|---|
| 1 | Dislike Very Much |
| 2 | Dislike Moderately |
| 3 | Dislike Slightly |
| 4 | Neither Like Nor Dislike |
| 5 | Like Slightly |
| 6 | Like Moderately |
| 7 | Like Very Much |

Specific application product traits which are important to the application are measured using this system in a panel of food and meat scientists.

The present invention relates to a novel isoflavone-enriched soy protein product having protein content greater than 60% of total dry matter; total dietary fiber content less than 4% of total dry matter; sucrose content greater than 10% of total dry matter; total sulfur-containing amino acid content greater than 2.2% of total amino acid content; stachyose content less than 1.5% of total dry matter; and total isoflavone content greater than 2500 micrograms/gram.

Furthermore, this invention also concerns a method for the manufacture of an isoflavone-enriched soy protein product of the invention which comprises: (a) preparing soyflour or flakes from soybeans wherein the soyflour or flakes have a stachyose content of less than 2.0% of total dry matter, a sucrose content of greater than 9.0% of total dry matter, and a total isoflavone content greater than 2,000 micrograms/gram of total dry matter (b) contacting the material from (a) with a solvent to preferentially remove the dietary fiber; (c) collecting the soluble material from (b) by centrifugation or other equivalent physical means; and (d) drying the soluble material from (c) to an appropriate level of moisture to allow for optimum handling and subsequent use of the soy protein product.

In a preferred embodiment, the isoflavone-enriched soy protein product of the invention can be manufactured from a soy flour with stachyose content of less than 0.5% of total dry matter and a sucrose content of greater than 12.5% of total dry matter.

Utilization of this (low stachyose, high sucrose) soy flour as the raw material allows for the soluble sugars to remain as a part of the novel soy protein product instead of being eliminated as waste. This gives the novel soy protein product a unique composition and results in a product with a slightly sweet taste with reduced soy flavor and no astringent or bitter notes allowing for increased usage levels in applications when compared to commercially available soy isolates and concentrates. Utilization of the method of the invention to produce the novel soy protein product results in significantly increased isoflavone concentration, improved Nitrogen Solubility Index, decreased manufacturing cost, and elimination of the waste sugar stream when compared to commercial processes to produce soy protein isolates and concentrates. Additionally, the process results in an increased cysteine and methionine concentration when compared to commercial soy isolates and improved mouthfeel when compared to commercial soy concentrates. Site selection for a novel soy protein factory is not dependent on local availability of waste treatment capacity.

Low Stachyose Soybeans

Any low stachyose soybeans can be used to practice the present invention. For example, low stachyose soybeans such as those described in PCT International Application Number PCT/US92/08958 published under International Publication Number WO 93/07742 on Apr. 29, 1993 (Attorney Docket Number BB-1034-A), the disclosure of which is hereby incorporated by reference, and U.S. Ser. No. 08/835,751 (Attorney Docket Number BB-1077) filed on Apr. 8, 1997 simultaneously herewith, the disclosure of which is hereby incorporated by reference, can be used.

Raffinose saccharides are a group of D-galactose-containing oligosaccharides of sucrose that are widely distributed in plants. Raffinose saccharides are characterized by having the general formula O-α-D-galactopyranosyl-$(1\rightarrow 6)_n$-α-glucopyranosyl-$(1\rightarrow 2)$-β-D-fructofuranoside where n=1 through n=4 are known respectively as raffinose, stachyose, verbascose, and ajugose. The raffinose saccharide of interest in the present invention is stachyose.

Extensive botanical surveys of the occurrence of raffinose saccharides have been reported in the scientific literature Dey, P. M. In *Biochemistry of Storage Carbohydrates in Green Plants*, Academic Press, London, (1985) pp 53–129. Raffinose saccharides are thought to be second only to sucrose among the nonstructural carbohydrates with respect to abundance in the plant kingdom. In fact, raffinose saccharides may be ubiquitous, at least among higher plants. Raffinose saccharides accumulate in significant quantities in the edible portion of many economically significant crop species. Examples include soybean (*Glycine max* L. Merrill), sugar beet (*Beta vulggris*), cotton (*Gossypium hirsutum* L.), canola (*Brassica sp.*) and all of the major edible leguminous crops including beans (*Phaseolus sp.*), chick pea (*Cicer arietinum*), cowpea (*Vigna unguiculata*), mung bean (*Vigna radiata*), peas (*Pisum sativum*), lentil (*Lens culinaris*) and lupine (*Lupinus sp.*).

Although abundant in many species, raffinose saccharides are an obstacle to the efficient utilization of some economically important crop species. Raffinose saccharides are not digested directly by animals, primarily because α-galactosidase is not present in the intestinal mucosa Gitzelmann and Auricchio.(1965) *Pediatrics* 36:231–236; Rutloff et al. (1967) *Nahrung*. 11:39–46. However as was noted above, microflora in the lower gut are readily able to ferment the raffinose saccharides which results in an acidification of the gut and production of carbon dioxide, methane and hydrogen [Murphy et al. (1972) *J Agr. Food Chem.* 20:813–817; Cristofaro et al. In *Sugars in Nutrition*, (1974) Chapter 20, 313–335; Reddy et al. (1980) *J. Food Science* 45:1161–1164]. The resulting flatulence can severely limit the use of leguminous plants in animal, including human, diets. It is unfortunate that the presence of raffinose saccharides restricts the use of soybeans in animal, including human, diets because otherwise this species is an excellent source of protein and fiber.

One of the problems faced by producers of soy protein concentrates and isolates is the challenge of selectively purifying the protein away from the raffinose saccharides. Considerable equipment and operating costs are incurred as a result of removing the large amounts of raffinose saccharides that are present in soybeans.

The problems and costs associated with raffinose saccharides could be reduced or eliminated through the availability of genes that confer a reduction of raffinose saccharide content of soybean seeds. Such genes could be used to develop soybean varieties having inherently reduced raffinose saccharide content. Soybean varieties with inherently reduced raffinose saccharide content would improve the nutritional quality of derived soy protein products and reduce processing costs associated with the removal of raffinose saccharides. Low raffinose saccharide soybean varieties would be more valuable than conventional varieties for animal and human diets and would allow mankind to more fully utilize the desirable nutritional qualities of this edible legume.

U.S. Ser. No. 08/835,751 (Attorney Docket Number BB-1077) describes a mutated form of a soybean gene and methods to improve the carbohydrate and phytic acid composition of soybean seeds and derived products. Examples of a method to identify mutations in this gene and to use derived mutant soybean lines to reduce the raffinose saccharide and phytic acid content of soybean seeds are taught in U.S. Ser. No. 08/835,751 (Attorney Docket Number BB-1077). Also taught are methods of using gene silencing technology and the soybean gene sequence for myo-inositol-1-phosphate synthase to reduce the raffinose saccharide content in soybean seeds.

Seeds derived from the plants described in U.S. Ser. No. 08/835,751 (Attorney Docket Number BB-1077) express an improved soluble carbohydrate content relative to commercial varieties. The improvements result in a reduced total raffinose plus stachyose content. The carbohydrate profile of these lines is dramatically different from the profiles seen in elite or germplasm lines used in or produced by other soybean breeding programs.

Screening of mutagenized soybean populations revealed two lines, LR33 and LR28, that appeared to be low in raffinose saccharides (LR28 is disclosed in World Patent Publication WO93/07742). The low raffinose saccharide phenotype of LR33 was demonstrated to be heritable by analysis of three subsequent generations of LR33 produced by self-fertilization.

The physiological defect in LR33 leading to the unique phenotype displayed by this line was identified and characterized by conducting a series of elegant genetic and biochemical studies. The defect in LR33 was shown to be genetically and biochemically distinct from the mutation in LR28 that leads to the low stachyose phenotype of that line. Moreover, the mutation in LR33 demonstrates greater pleiotrophy than the defect in LR28. The LR33 phenotype includes not only reduced raffinose saccharide content, but also results in alterations in seed phytic acid, inorganic phosphate and sucrose levels. Further analyses confirmed that genetic information derived from LR33 alone could confer this unique phenotype on progeny soybean lines, and that the mutant gene or genes in LR33 are not simply genetic modifiers that enhance the phenotypic expression of genes derived from other mutant soybean lines.

The specific biochemical defect responsible for the heritable phenotype demonstrated by LR33 and its progeny has been identified. This was accomplished by consideration of the biosynthesis of raffinose saccharides and the control of phytic acid and inorganic phosphate levels in soybean seeds. Based upon these known biosynthetic pathways, a series of biochemical studies and subsequent molecular genetic analyses identified defect in LR33 seeds as an alteration in myo-inositol 1-phosphate synthase activity, leading to a decreased capacity for synthesis of myo-inositol 1-phosphate.

The biosynthesis of raffinose and stachyose has been fairly well characterized [see Dey, P. M. In Biochemistry of Storage Carbohydrates in Green Plants (1985)]. Myo-Inositol hexaphosphate or phytic acid and raffinose saccharides share myo-inositol as a common intermediate in their synthesis [Ishitani, M et al., The Plant Journal (1996) 9:537–548].

Either glucose or sucrose can be the starting material for the polyol portion of phytic acid, all of the hexoses that make up raffinose and stachyose and the re-cycled portion of the galactose donor to raffinose synthase and stacyhose synthase, myo-inositol. The end products of these interconversions that accumulate in mature, wild type soybean seeds are, in order of prominance by mass, sucrose, stachyose, phytic acid, and raffinose.

The committed reaction of raffinose saccharide biosynthesis involves the synthesis of galactinol (O-α-D-galactopyranosyl-(1→1)-myo-inositol) from UDPgalactose and myo-inositol. The enzyme that catalyzes this reaction is galactinol synthase. Synthesis of raffinose and higher homologues in the raffinose saccharide family from sucrose is catalyzed by the galactosyltransferases raffinose synthase and stachyose synthase.

Control over the ratio of these end products may be affected by altering the rate of conversion at many of the enzyme catalyzed steps. That control can be affected by altering enzyme expression level or by altering the intrinsic activity of the enzyme. The resulting mix of end products coming from the modified pathway may then comprise new proportions of the original end products as well as new product mixes which include accumulations of some of the normal intermediates. The exact mix and composition will depend upon both the enzyme which has been altered in its activity and the degree of that alteration.

The six enzymes myo-inositol 1-phosphate synthase, myo-inositol 1-phosphatase UDP-glucose-4'-epimerase, galactinol synthase, raffinose synthase, and stachyose synthase could be reduced in activity to decrease either raffinose or stachyose synthesis without decreasing sucrose content. Of these six, the three enzymes unique to raffinose and stachose synthesis could be decreased in activity without decreasing phytic acid content. Only myo-inositol 1-phosphate synthase appears to be involved in the synthesis of all three end products and may therefore change the amount of all three end products simultaneously if its activity is decreased.

The ability to simultaneously reduce raffinose saccharide and phytic acid content and increase sucrose and inorganic phosphate content in soybean seeds by reducing myo-inositol 1-phosphate synthase activity in the cells of soybean seeds is taught in U.S. Ser. No. 08/835,751 (Attorney Docket Number BB-1077). Generation and discovery of a mutant form of this enzyme wherein a point mutation in the nucleotide sequence encoding this enzyme results in an amino acid substitution which, in turn, lowers intracellular enzymatic activity is described in U.S. Ser. No. 08/835.751 (Attorney Docket Number BB-1077). It is well known to the skilled artisan that other mutations within the coding region for myo-inositol 1-phosphate synthase can result in decreased enzymatic activity and thus result in such a seed phenotype. Using well known techniques of heterologous gene expression and in vitro mutagenesis, and employing the various enzymatic assays described herein, the skilled artisan could identify other mutations within the myo-inositol 1-phosphate synthase coding region that result in decreased enzymatic activity without undue experimentation. These mutated myo-inositol 1-phosphate synthase genes could then be introduced into the soybean genome (see U.S. Pat. No. 5,501,967) and result in new soybean varieties displaying this phenotype.

Alternatively, gene silencing techniques such as antisense inhibition technology (U.S. Pat. No. 5,107,065) and cosuppression (U.S. Pat. No. 5,231,020) may be employed to reduce the intracellular myo-inositol 1-phosphate synthase activity in the cells of soybean seeds. The sequence of the gene encoding the wild type soybean myo-inositol 1-phosphate synthase enzyme is described in U.S. Ser. No. 08/835,751 (Attorney Docket Number BB-1077). The skilled artisan will readily appreciate how to make and how to use chimeric genes comprising all or part of the wild type sequence or substantially similar sequences to reduce myo-inositol 1-phosphate synthase activity in soybean seeds.

Another example of a low stachyose soybeans which can be used to practice the invention is described in PCT International Publication Number WO 93/07742. The following terms will be used in discussing the soybeans which constitute the subject matter of WO 93/07742:

"Stc1 locus" refers to a genetic locus within soybean that affects raffinose saccharide content in soybean seeds. The term "Stc1" (with a capital "S") refers to the wild type allele that confers a normal raffinose saccharide content. The terms "stc1a" and "stc1b" (with a lower case "s") refer to two separate but allelic soybean genes at the Stc1 locus, that confer low raffinose saccharide content. The term "stc1x" (lower case "s") is a general term referring to any allele at the Stc1 locus (including stc1a, stc1b, and other possible alleles) that confer a low total raffinose saccharide phenotype. "PI" or "plant introduction" refers to one of many soybean germplasm lines collected and maintained by the United States Department of Agriculture. "LR28" (an abbreviation synonymous with "PI 200.508") is the designation for a soybean line that was the source of the stc1a gene discovered by the Inventors. "LR484" is the designation for a soybean line derived from mutagenesis of elite cultivar "Williams 82". LR484 is the source of gene "stc1b". The phrase "line(s) containing stc1a" or "stc1a line(s)" indicates that the line(s) is homozygous for stc1a as evidenced by the line's pedigree and abnormally low raffinose saccharide content. The phrase "line(s) containing stc1b" or "stc1b line(s)" indicates that the line(s) is homozygous for stc1b as evidenced by the line's pedigree and abnormally low raffinose saccharide content. The phrase "lines containing stc1x" or "stc1x line(s)" indicates that the line(s) is homozygous for stc1x as evidenced by the line's pedigree and abnormally low raffinose saccharide content. "Conventional soybean lines" refers to lines that do not contain an stc1x allele.

Seeds from the plants described in WO93/07742 express an improved soluble carbohydrate content relative to commercial varieties. The improvements result in a reduced total raffinose saccharide content. The carbohydrate profile of these lines are dramatically different from the profiles seen in elite or germplasm lines used in or produced by other soybean breeding programs.

Three separate methods to produce the novel soybean genes described in WO93/07742 are taught. The first approach involved exhaustive screening of existing soybean germplasm collections for sources of genes conferring low raffinose saccharide content. This germplasm screen was successful despite the failure of previous attempts by others to select and confirm germplasm with significant reduction of raffinose saccharides. The second approach marks the first successful attempts to induce a mutation conferring low raffinose saccharide content. These first two approaches resulted in the discovery of major stc1x genes that can be used to develop soybean lines that are superior (in terms of reduced raffinose saccharide content) to any lines previously reported. The third approach was a system that involved the crossing of germplasm lines with stc1x lines that ultimately lead to the discovery of modifier genes that enhance the expression of stc1x genes. These modifiers, in combination with stc1x, reduce raffinose saccharide content below that of unmodified stc1x lines.

After screening approximately 14,000 lines from germplasm collections, a soybean gene stc1a was discovered in line LR28 and shown to confer a reproducibly low total raffinose saccharide content. To confirm its value as a source of altered carbohydrate content, the seed composition of LR28 was compared to that of a number of other PI's and elite lines that have been reported in the literature as having the genetic potential for improving the raffinose saccharide content of soybean. This analysis under identical assay conditions indicated that LR28 displayed a substantially reduced raffinose saccharide content compared to any currently known source of germplasm. Inheritance studies indicated that LR28 contains a single recessive to codominant gene (designated stc1a) that confers the low raffinose saccharide trait. High protein content segregates independently of stc1a and that high protein content can be recombined with low raffinose saccharide content by conventional breeding techniques to produce lines having both traits.

The second approach, mutagenesis, resulted in the creation of mutant gene stc1b that confers a low raffinose saccharide phenotype similar to that conferred by stc1a. Genetic studies indicated that stc1b is allelic to stc1a. Consequently, it is expected that stc1b can be used as an alternative source of the low raffinose saccharide trait conferred by stc1a. As with stc1a, it is expected that stc1b will be recombined with any other heritable seed trait or agronomic trait of interest. Since the stc1b mutation was induced within the genetic background of an elite variety, it is expected that minimal breeding effort will be required to recombine stc1b with desirable agronomic performance.

While confirming the heritability of the major stc1x genes, modifier gene(s) were discovered that complement stc1x to further reduce raffinose saccharide content. World Patent Application WO93/07742 describes a protocol which can be used to show examples of modifier genes that can be used to reduce the inherent raffinose saccharide content of soybean seeds by up to 97%.

If the low raffinose saccharide germplasm described in World Patent Application WO93/07742 is crossed with germplasm sources containing other desirable traits, it is expected that a fraction of the resultant progeny will inherit low raffinose saccharide content in combination with the desirable trait(s) from other said germplasm sources. Desirable seed traits that will be combined with low raffinose saccharide content include (but are not limited to) high protein content, high methionine content, high lysine content, high oleic acid content, high stearic acid content, low palmitic acid content, low linoleic acid content, low linolenic acid content, lipoxygenase nulls, and trypsin inhibitor nulls. It is also expected that stc1x will be combined with any trait of agronomic significance to develop elite lines. Examples of such agronomic traits include (but are not limited to) emergence vigor, seedling vigor, vegetative vigor, disease resistance, pest resistance, herbicide resistance, drought resistance, lodging resistance, and high seed yield.

Manufacture of a Novel Soy Protein Product

The preferred method for the defatting of low stachyose soybeans is a food-grade soybean crushing process utilizing hexane extraction. Low stachyose, high sucrose soybeans are detrashed in a series of screening and air classification processes, and are subsequently fed to cracking rolls to loosen the hull. Another series of screening and air classification steps is performed to remove the hulls so that the remaining nutmeats preferably contain less than 4% crude fiber. After conditioning the nutmeats, flaking rolls crush the nutmeats into flakes with a thickness of 0.25 to 0.60 mm. These flakes are fed into a counter current hexane reactor to extract the soybean oil. The soybean oil is extracted from the soybean flakes, and the oil/hexane mixture, known as miscella, is removed. In order to remove residual solvent, defatted soybean flakes are heated under vacuum in a low temperature flash desolventizing solvent removal and recovery system so that the final PDI is approximately 90%, but not more than 8% lower than the PDI of the original soybeans. Such dehulled, defatted soybeans have a residual hexane content of less than 0.1%, a residual oil content of less than 1%, a crude fiber content of less than 4%, and a moisture level of less than 8%.

Alternatively, other commercially available methods and processing techniques which are well known to those skilled in the art may be employed for the preparation of defatted soybean flakes. However, such methods and techniques should produce a defatted flake having a PDI of greater than 60% and a residual oil content of less than 5% for acceptable raw material conversion and novel soy protein product functionality.

Defatted soybean flakes produced from the low stachyose soybeans in the preferred method described above are further processed by an aqueous extraction and separation method to prepare the novel soy protein product. In a preferred method, one part of such defatted flakes is mixed with 10 parts potable water at 88° C. The mixture is held at 88° C. for more than 6 but less than 10 minutes, and then added to 5 parts water at 10° C. such that the temperature of the mixture is adjusted to 40°–45° C. This heating procedure denatures naturally occurring enzymes present in the defatted soybean flakes. The pH of the mixture is adjusted to 8.0 with calcium hydroxide, and the mixture is held for 20 minutes under agitation in order to extract the proteins. The proteins are solubilized in the water along with the soluble carbohydrates in the extraction. The extraction mixture is then fed to a continuous horizontal decanting centrifuge to separate the soluble and insoluble fractions. The centrifuge is fed at such rate and backdrive settings that the liquid fraction discharge containing primarily soluble carbohydrates and dissolved proteins contains less than 2% by volume insoluble matter, and such that insoluble fraction has a solids content greater than 18% solids by weight. The liquid fraction discharged contains a dilute solution (approximately 5% by weight) of the novel protein product which is collected in a storage tank. The insoluble fraction discharge is re-extracted by adding 5.25 parts water at 45° C. and feeding this mixture to a second horizontal decanting centrifuge. The centrifuge is operated such that the liquid discharge contains less than 3% insoluble material by volume, and the insoluble discharge has a solids content greater than 20% solids by volume. The liquid discharge from the second centrifuge is combined with the collected liquid discharge from the first centrifuge. This combined discharge contains the novel soy protein product at approximately 4% concentration and represents a yield equal to 80% of the weight of the defatted flakes. The insoluble discharge from the second separation contains mostly fiber, which remains a by-product of this process.

Alternatively, an acceptable form of the novel isoflavone-enriched soy protein product of the invention may be produced with the following modifications to the above conditions: (1) elimination of the initial 88° C. heating step; (2) use of water ratios for the first extraction of 10–20 parts of water per part of defatted flakes; (3) use of extraction water temperature from 25° to 60° C.; (4) use of sodium hydroxide, potassium hydroxide, ammonium hydroxide, or similar alkali for adjustment of pH; (5) elimination of alkali for extraction of defatted flakes; (6) elimination of second extraction of flakes; (7) selection of horizontal decanting centrifuges for insolubles separation such as Sharples P-3400, P-5000, P-5400, or P-7600, Westphalia CA-505 or 515, Delaval NX-218 or 418, Bird or similar decanter; or (8) use of a disc or other type centrifuge or separation device capable of effecting such separation.

The preferred method of processing and drying the novel soy protein product into a finished powdered product comprises increasing the concentration of the product for drying economics, homogenization and pasteurization of the product, and spray drying. The aqueous solution of the novel soy protein concentrate at approximately 4% solids is neutralized if necessary by adding dilute hydrochloric acid under vigorous agitation to pH 7.1–7.3 and then is concentrated by evaporation in a three effect falling film evaporator with thermal vapor recompression. The evaporator is operated such that the product temperature is maintained at 75° C. or less at all times during the continuous evaporation process. The evaporator is operated to maintain a discharge solids of 12%. The product is then homogenized at 165/30 bar in a two stage homogenizer and pasteurized at 140° C. for 15–20 seconds using direct steam injection, then immediately cooled in a flash cooler to less than 60° C. The product is spray dried in a high pressure atomizer, tall form cylinder spray drier at 150–200 bar pump pressure. Inlet temperatures are maintained at 200°–260° C., and the outlet temperature is constantly adjusted such that a 4% moisture is achieved. Throughput changes with pump pressures such that the exhaust air stream has less than 15% relative humidity.

Product Yield and Manufacturing Cost

The novel isoflavone-enriched soy protein, commercially available concentrate, and commercially available soy isolate all are produced using a defatted soybean flake or flour as the raw material. However, the unique sugar composition of the low stachyose, high sucrose flour processed in the unique way as identified herein allows for the manufacture of the novel soy protein in a unique manner when compared to commercial soy concentrate and isolate processes. The sugars in all processes to manufacture commercial soy concentrates and isolates and are removed as a waste product which must be treated in high cost conventional waste treatment processes or concentrated and added back to animal grade soybean meal. Table 1 provides a comparison between the compositions of the respective products, process by-products and waste generated in the production of these products, product yields, and the increase in costs to manufacture commercial concentrates ("com'l concentrates") and commercial isolates ("com'l isolates") compared to novel.

TABLE 1

COMPARISON OF THE PRODUCT COMPOSITION, PROCESS BY-PRODUCTS, WASTE, YIELD, AND COST FACTORS: NOVEL PROTEIN VS. COMMERCIAL CONCENTRATES AND ISOLATES[a]

| PRODUCT COMPOSITION, AS IS % | NOVEL PROTEIN | COM'L CONCEN-TRATE | COM'L ISOLATE |
|---|---|---|---|
| PROTEIN | 64 | 70 | 86 |
| DIETARY FIBER | 4 | 24 | 5 |
| SOLUBLE SUGARS | 18 | 1 | 1 |
| ASH | 9 | 4 | 5 |
| PROCESS BY-PRODUCT | FIBER | NONE | FIBER |
| PROCESS WASTE | NONE | SUGARS | SUGARS |
| PRODUCT YIELD | 80% | 65% | 40% |
| BY-PRODUCT YIELD | 20% | NONE | 20% |
| RAW MATERIAL COST | 375 | 462 | 600 |
| BY-PRODUCT CREDIT | 37.5 | NONE | 75 |
| NET RAW MATERIAL COST | 337.5 | 462 | 525 |
| INCREASED RAW MATERIAL COST COMPARED TO NOVEL | — | 124.5 | 187.5 |
| WASTE SUGAR TREATMENT COST | — | 90 | 90 |
| TOTAL INCREASED COST COMPARED TO NOVEL | — | 214.5 | 277.5 |

[a]Unless otherwise indicated, all product costs are expressed as $/metric ton of finished product. Flake/Flour cost used is $300/metric ton. Fiber by-product value is $150/metric ton.

Characteristics of the Novel Soy Protein Product

The composition of the novel soy protein product produced by the preferred method above are shown in Tables 2 and 3. For comparison purposes, the composition of a commercially available soy protein concentrate and isolate are also shown in Tables 2 and 3. Comparison of the isoflavone contents of the novel soy protein product and the commercially available soy protein concentrate and isolate are shown in Table 3.

TABLE 2

COMPOSITION OF SOY PROTEIN PRODUCTS[a]

| TYPE | Stachyose | Raffinose | Sucrose | Total Soluble CHO | Protein | Total Dietary Fiber |
|---|---|---|---|---|---|---|
| NOVEL PROTEIN | 0.1–0.4 | 0.2 | 12.0–21.0 | 17.0–22.0 | 61.0–66.0 | 2.0 |
| COM'L CONC. | 0.2 | 0.0 | 0.3 | 0.8 | 74.0 | 24.0 |
| COM'L ISOLATE | 0.3 | 0.0 | 0.5 | 0.8 | 90.6 | 5.7 |

[a]All measurements are percent dry basis.

TABLE 3

ISOFLAVONE ANALYSIS OF SOYBEAN PROTEIN PRODUCTS[a]

| TYPE | DAIDZEIN | GENISTEIN | GLYCITEIN | TOTAL |
|---|---|---|---|---|
| NOVEL PROTEIN | 1150–1725 | 1300–1775 | 225–300 | 2800–3800 |
| COM'L CONC. | 35–45 | 60–68 | 0–10 | 95–125 |
| COM'L ISOLATE | 550–750 | 800–900 | 125–150 | 1500–1600 |

[a]All measurements are μg/g.

The novel isoflavone-enriched soy protein product is an excellent product for use in the production of emulsified meat, processed meat, brine injected whole muscle meats, heat processed food products, infant formulas, frozen desserts, milk replacers, yogurt, and nutritional beverages. When the soy protein product of the invention is used in the formulation of a liquid or powdered milk replacer product it should be present as an ingredient in the product formula at a formula percentage of 20–60% on a dry weight basis. When the soy protein product of the invention is used in the formulation of a liquid or powdered soy-based infant formula then it should be present as an ingredient in the formula at a formula percentage of 7–21% on a dry weight basis. When the soy protein product of the invention is used in the formulation of a soy-based nutritional beverage powder or liquid then it should be present as an ingredient in a formula at a formula percentage of 10–100% on a dry weight basis. When the soy protein product of the invention is used in the formulation of an imitation processed cheese spread then it should be present as an ingredient in the spread formulation at 10–50% of the protein used in the formula. When the soy protein product of the invention is used in the formulation of a water-injected combination ham then it should be present as an ingredient in the combination ham formulation at a percentage of 2.5–10% of the raw weight of the ham prior to water injection. When the soy protein product of the invention is used in the formulation of a soy extended bologna then it should be used as an ingredient in the formulation at a percentage of 2–6% formula basis. When the soy protein product of the invention is used in the formulation of a soy-extended yogurt product then it should be present as an ingredient in the formulation at a formula percentage of 20–60% on a dry weight basis. When the soy protein product of the invention is used in the formulation of a soy-based frozen then it should be present as an ingredient in the dessert formulation at a formula percentage of 5–20%.

The novel isoflavone-enriched soy protein product of the invention displays functional properties that are comparable or superior to those displayed by the commercially available soy protein concentrate and isolate as shown in Table 4.

TABLE 4

COMPARISON OF THE FUNCTIONAL PROPERTIES OF THE INSTANT SOY PROTEIN PRODUCT, A COMMERCIAL SOY PROTEIN CONCENTRATE AND A COMMERCIAL SOY PROTEIN ISOLATE

|  | NOVEL | COM'L CONC. | COM'L ISOLATE |
| --- | --- | --- | --- |
| FLAVOR | Sweet; Slight Grain | Soy; Astringent | Slight Soy; Bitter |
| SOL. INDEX | 0.3 | 26 | 3.5 |
| NSI | 91% | 46% | 68% |

The novel soy protein product produced by this method is an excellent product for emulsified meat, processed meat, heat processed food products, and nutritional beverages. The novel protein product displays functional properties that are comparable or superior to those displayed by the commercially available soy protein concentrate and isolate.

Alternate Methods of Processing the Novel Soy Protein Product

Alternate methods of processing and drying may be employed by those skilled in such art, to modify certain physical or chemical characteristics of the novel soy protein product for successful utilization in specific applications. For example, an alternate product can be prepared by performing a controlled enzymatic hydrolysis (using papain, bromelian, neutrase, alcalase, or other suitable protease) before the evaporation procedure. Such a procedure would further improve the slightly grainy flavor, reduce product viscosity, increase product bulk density, improve powder dispersibility, increase powder particle size, reduce product drying cost, increase the emulsification capacity, improve the product solubility, reduce average molecular weight, and make the product more white, although reducing the gelation capacity. This form of novel soy protein product which can be differentiated by degree of hydrolysis would make an excellent family of products for infant formulas, health food products, and nutritional beverages.

Another alternative product would involve co-processing dairy proteins with enzymatically modified novel soy protein concentrate before evaporation to produce a co-dried product with excellent flavor, solubility, and other physical properties similar to dairy proteins for use in milk replacers and nutritional beverages.

A higher protein content alternative product can be manufactured by inserting an ultrafiltration step immediately before the evaporation step in the preferred method of processing and drying described above. In the preferred method of this ultrafiltration step, a polysulfone membrane with a 40,000 daltons cutoff can be used to selectively remove dissolved minerals and sugars in the ultrafiltration permeate while retaining the proteins in the retentate, thus increasing the protein concentration of the novel soy protein product. The amount of permeate removed will determine the final protein purity of the novel soy protein product. For example, removal of half of the permeate volume through ultrafiltration would increase the protein content of the finished product by one third. Alternatively, forms of ultrafiltration can be utilized to make a successful product such as other materials of membrane construction and different molecular weight cutoffs. The protein content can be increased by this method of ultrafiltration and/or diafiltration to produce a soy protein isolate, although at the expense of many of the product benefits which the novel soy protein product can provide.

Comparison of the Novel Protein Product to Commercial Soy Protein Products

Varieties of low stachyose, high sucrose soybeans, such as those discussed below, can be processed in the preferred or alternative methods as discussed above, to produce a novel soy protein product possessing several advantages over traditional soy protein concentrates or isolates. The product's benefits of natural sweetness, high concentrations of isoflavones, and elimination of traditional soy taste will be of benefit in all applications where traditional, commercially available soy protein concentrates and soy protein isolates are currently used.

The benefits of the isoflavone-enriched soy protein product of the invention, compared to commercially available soy protein isolates, are: 1) natural sweetness; 2) mixed isoflavone concentration that is increased by 17:5 to 250%; 3) improved product flavor by significant reduction of traditional soy taste; 4) increase in raw material conversion by 100%; 5) minimum $277.5/metric ton reduction in product manufacturing cost; 6) retention of carbohydrates as part of the product rather than process waste; and 7) location of production facilities does not depend on available waste treatment capacity.

The benefits of the novel soy protein product, compared to commercially available soy protein concentrates, are: 1) natural sweetness; 2) mixed isoflavone concentration that is increased by 2700 to 3800 %; 3) improved product flavor by elimination of traditional soy taste; 4) product solubility is increased by 100%; 5) the novel product can be used in beverage, health food, and infant formula applications; 6) increase in raw material conversion by 15%; 7) minimum $214.5/metric ton reduction in product manufacturing cost; and 8) retention of carbohydrates as part of the product rather than process waste.

The present invention is further defined herein in which all parts and percentages are by dry weight and degrees are Centrigade, unless otherwise stated. It should be understood from the above discussion, while indicating preferred embodiments of the invention, is given by way of illustration only. From the above discussion and the following Examples, one skilled in the art can ascertain and, without departing from the spirit and scope thereof, can make various changes and modifications of the invention to adapt it to various uses and conditions.

EXAMPLE 1

MANUFACTURE OF A NOVEL SOY PROTEIN PRODUCT

This example illustrates a specific embodiment of the invention produced at The University of Minnesota Food Science Pilot Plant. High sucrose, low stachyose, defatted soy flakes of two varieties were run with a control of commodity defatted soy flakes. The same process was employed to produce the novel soy protein product for the three varieties of soy flakes, and the novel isoflavone-enriched soy protein products are hereinafter labeled DUPONT 1(A232QT), DUPONT 2(4GxE117), and CONTROL. 11.3kg of soy flakes, 113.4 kg of water, and 210 ml of 30% NaOH were placed in a tank heated to 55° C. and agitated for 30 min. The mixture was then pumped to a Westphalia SB-7 Self Desludging Disk Centrifuge at a rate of 2 L per min with a back pressure of 4 bar, shutter time of 7 minutes, and 4 partial shots to one full shot. The centrate from this extraction was then pumped into a holding tank at 5°–7° C. while the sludge was collected in a separate tank. The sludge was combined with 68 kg of water at 52° C. and agitated for 30 min. The sludge and water were then pumped to the same centrifuge at the same settings and re-separated. The centrate from this process was combined with the centrate from the previous process at 5°–7° C.

The centrate was then pasteurized, evaporated, and spray dried according to the following conditions in order to obtain a finished powdered product. The centrate solution was pumped to an APV Junior S/S High Temperature/Short Time Pasteurizer and was pasteurized at 93° C. for 20 sec with flash cooling to 57° C. Evaporation to 12% solids was accomplished by pumping the sludge to a C. E. Rogers Single Effect Rising Film Evaporator at a temperature of 74° C. A Niro Utility Dryer employing centrifugal wheel atomization with an inlet temperature of 200° C. and an outlet temperature of 90°–100° C. dried the solution to a finished powdered product.

The material balance data in Table 5 was obtained from the product runs performed to produce DUPONT 1, DUPONT 2 and CONTROL. The overall yield for the three varieties was approximately 80%. The products produced from the product runs along with commercial examples of soy protein isolate and concentrate were analyzed for composition using procedures specified in the test protocol section.

TABLE 5

MATERIAL BALANCE FOR EXAMPLE 1

| NOVEL SOY PROTEIN PRODUCT | PROTEIN RECOVERY, % | OVERALL YIELD, % |
|---|---|---|
| DUPONT1 | 94.7 | 81.4 |
| DUPONT2 | 86.6 | 77.7 |
| CONTROL | 92.5 | 80.1 |

The chemical analysis for the novel products compared to the commercial isolate and concentrate is given in Table 6. The DUPONT 1, DUPONT 2 and CONTROL novel soy protein products have unique compositions when compared to commercial isolate and concentrate. When compared to the commercial isolate, the novel concentrates have lower protein and fiber analysis with higher ash concentrations. When compared to the commercial concentrate, the novel concentrates have lower fiber and protein analysis with higher ash concentrations. The nitrogen solubility index of the novel concentrates is significantly greater than either of the commercial isolate or concentrate. The total isoflavone levels of all three novel concentrates are 1.79 to 2.42 times the level of the commercial isolate and 28 to 38 times the level of the commercial concentrate.

TABLE 6

CHEMICAL ANALYSIS FOR EXAMPLE 1

| ANALYSIS | DU-PONT1 | DU-PONT2 | CONTROL | COM'L ISOLATE | COM'L CONC. |
|---|---|---|---|---|---|
| PROTEIN, % DMB | 66.23 | 60.93 | 61.78 | 90.58 | 73.96 |
| DIETARY FIBER, % | 2.1 | 2.0 | 2.4 | 5.7 | 24.0 |
| ASM, % | 8.18 | 8.69 | 8.36 | 4.57 | 4.66 |
| FAT, % | 3.10 | 2.82 | 2.80 | 4.20 | 0.88 |
| NITROGEN SOLUBILITY INDEX | 91.3 | 90.9 | 97.4 | 67.6 | 45.8 |
| MOISTURE, % | 3.44 | 3.06 | 3.37 | 4.73 | 5.16 |
| DAIDZEIN, PPM | 1248 | 1719 | 1170 | 543 | 35 |
| GENISTEIN, PPM | 1341 | 1772 | 1645 | 906 | 63 |
| GLYCITEIN, PPM | 237 | 298 | 243 | 117 | 0 |
| TOTAL ISO-FLAVONES, PPM | 2826 | 3789 | 3058 | 1565 | 97 |

The carbohydrate analysis for the three novel products compared to commercial isolate and concentrates is given in Table 7. The total sugars for the novel soy proteins are significantly higher for the novel products when compared to the commercial isolate and concentrate. The CONTROL sample has a much greater stachyose level which would create the flatulence and product flavor issues that this would create, and make it an undesirable food ingredient. The stachyose and raffinose concentrations for the two DUPONT novel products are about the same as the commercial isolate and concentrate, however the sucrose concentrations are greatly increased in the novel DUPONT samples resulting in a sweet, less soy taste.

TABLE 7

CARBOHYDRATE ANALYSIS FOR EXAMPLE 1[a]

| ANALYSIS | DU-PONT1 | DU-PONT2 | CONTROL | COM'L ISOLATE | COM'L CONC. |
|---|---|---|---|---|---|
| STACHYOSE | 0.4 | 0.1 | 7.0 | 0.3 | 0.2 |
| RAFFINOSE | 0.2 | 0.2 | 1.0 | 0.0 | 0.0 |
| SUCROSE | 12.3 | 21.0 | 21.0 | 0.5 | 0.3 |
| TOTAL SUGARS | 12.9 | 21.3 | 19.5 | 0.8 | 0.5 |

[a]All measurements are percent dry matter.

The amino acid composition of the novel products is compared to the commercial isolate and concentrate in Table 8. Of considerable importance is the 20% increase in the DUPONT, CONCENTRATE and CONTROL products of the sulfur containing amino acids cysteine and methionine compared to the commercial isolate.

TABLE 8

AMINO ACID ANALYSIS FOR EXAMPLE 1[a]

| AMINO ACID | DU-PONT1 | DU-PONT2 | CONTROL | COM'L ISOLATE | COM'L CONC. |
|---|---|---|---|---|---|
| CYSTEINE | 1.16 | 1.12 | 1.12 | 0.89 | 1.21 |
| ASPARTIC ACID | 11.54 | 11.22 | 11.67 | 11.11 | 1185 |
| METHIONINE | 1.15 | 1.15 | 1.02 | 1.04 | 1.18 |
| THREONINE | 3.55 | 3.49 | 3.32 | 3.38 | 3.74 |
| SERINE | 5.02 | 4.87 | 4.94 | 5.05 | 5.29 |
| GLUTAMIC ACID | 18.03 | 17.30 | 18.48 | 18.38 | 18.07 |
| GLYCINE | 3.98 | 3.86 | 3.90 | 4.08 | 4.30 |
| ALANINE | 4.22 | 4.28 | 3.94 | 4.14 | 4.52 |
| VALINE | 3.83 | 3.97 | 3.82 | 3.83 | 4.34 |
| ISOLEUCINE | 3.41 | 3.24 | 3.44 | 3.66 | 3.52 |
| LEUCINE | 6.96 | 6.57 | 6.82 | 7.52 | 7.47 |
| TYROSINE | 3.07 | 2.99 | 3.13 | 3.12 | 2.27 |
| PHENYL-ALANINE | 4.50 | 4.30 | 4.53 | 4.65 | 4.48 |
| HISTIDINE | 2.40 | 2.39 | 2.31 | 2.44 | 2.60 |
| LYSINE | 5.75 | 5.55 | 5.65 | 6.02 | 6.44 |
| ARGININE | 7.21 | 9.02 | 7.02 | 7.18 | 7.29 |

[a]All measurements are percent of total amino acid contnet.

EXAMPLE 2

MANUFACTURE OF A SOY-BASED MILK REPLACER

This example illustrates making a soy-based whole milk replacer without vitamins, minerals, and trace nutrients using the novel soy protein product of the present invention compared to commercial isolate and concentrate. The ingredients used in the formulation are given in Table 9 and procedure are listed below:

TABLE 9

FORMULA FOR A SOY-BASED WHOLE MILK REPLACER WITH VITAMINS; MINERALS, AND TRACE ELEMENTS

| INGREDIENTS | ISOLATE FORMULA, % | NOVEL FORMULA, % |
|---|---|---|
| SWEET DAIRY WHEY | 40.0 | 34.5 |
| SOY PROTEIN ISOLATE/NOVEL | 27.0 | 33.5 |
| VEGETABLE OIL | 26.0 | 26.0 |
| SUCROSE | 4.0 | 3.0 |
| EMULSIFIERS | 1.5 | 1.5 |
| SALTS; VITAMINS, AND MINERALS | 1.0 | 1.0 |
| FLAVORING | 0.5 | 0.5 |

All oils for the tests were combined in a separate tank and heated to 66° C., and then the emulsifiers were added. The soy product was stirred into water at 49° C. with adequate agitation to 18% solids. Neutrase enzyme at 0.1% of protein weight was added under constant agitation for one hour to hydrolyze the protein in the soy solution. The solution was pasteurized after an hour to stop the reaction by denaturing the enzyme. The whey, sugar, salts, minerals, and flavors were added and blended for 15 minutes before the oil with emulsifiers were added. After the entire mixture was blended for 15 minutes more it was pasteurized and spray dried.

The milk replacers were evaluated using a 7-point hedonic scale as discussed above and the results of the product comparisons are shown in Table 10. All protein products performed well in the ability to emulsify fat and remain soluble after rehydration. The CONTROL and DUPONT 2 products were inferior in flavor compared to the DUPONT 1 and commercial isolate products possibly due in part to the high level of isoflavones present in this delicately flavored food system. The isoflavones level in one 30 gram serving of reconstituted milk replacer powder is 2.2 to 2.9 times greater in the novel products compared to the commercial isolate milk replacer.

TABLE 10

EVALUATION OF THE SOY-BASED WHOLE MILK REPLACER

| ATTRIBUTE | DU-PONT1 | DUPONT2 | CONTROL | ISOLATE |
|---|---|---|---|---|
| APPEARANCE | 5.75 | 5.75 | 4.75 | 6 |
| FLAVOR | 3.75 | 2.75 | 2.5 | 4.25 |
| TEXTURE-MOUTHFEEL | 5.75 | 5.75 | 5.75 | 5 |
| EMULSION STABILITY | 7 | 7 | 7 | 7 |
| SOLUBILITY | 7 | 7 | 7 | 7 |
| MILLIGRAMS ISOFLAVONES PER 30 G SERVING | 28 | 38 | 31 | 13 |

EXAMPLE 3

MANUFACTURE OF A SOY-BASED INFANT FORMULA

This example illustrates using the novel soy protein product of the present invention compared to a commercial isolate for a soy-based infant formula base without vitamins, minerals, and trace nutrients. The ingredients used in the formulation of the infant formula base are given in Table 11 and procedure used is given below.

TABLE 11

FORMULA FOR A SOY INFANT FORMULA BASE
WITHOUT VITAMINS, MINERALS, AND TRACE ELEMENTS

| INGREDIENT | ISOLATE BASED FORMULA, % | NOVEL BASED FORMULA, % |
|---|---|---|
| 42 Dextrose Equivalent Corn Syrup solids | 35.0 | 35.0 |
| Soy Protein Product (ISOLATE\NOVEL) | 14.6 | 21.2 |
| Sucrose | 21.0 | 14.2 |
| Corn Oil | 14.0 | 14.0 |
| Coconut Oil | 10.6 | 10.6 |
| Soybean Oil | 3.4 | 3.6 |
| Emulsifiers | 1.4 | 1.4 |

All oils for the tests were combined in a separate tank and heated to 66° C., and then the emulsifiers were added. The soy product was stirred into water at 49° C. with adequate agitation to solubilized at 18% solids. Neutrase enzyme at 0.1% of protein weight was added under constant agitation for one hour to hydrolyze the protein in the soy solution. The solution was pasteurized after an hour to stop the reaction by denaturing the enzyme. The sugar and corn syrup solids were added and blended for 15 minutes before the oil with emulsifiers was added. After the entire mixture was blended for 15 minutes more it was pasteurized and spray dried.

The soy-based infant formulas were evaluated using a 7-point hedonic scale as discussed above and the results of the product comparisons are summarized in Table 12. All products performed well in emulsification of the fat after rehydration. The DUPONT 1 and 2 samples were judged to be significantly improved in flavor and mouthfeel compared to the commercial isolate based infant formula. Additionally, the concentration of sulfur-containing amino acids cysteine and methionine in the DUPONT and CONTROL starting materials were 20% greater than the commercial isolate sample.

TABLE 12

EVALUATION OF THE SOY-BASED INFANT FORMULA BASE

| ATTRIBUTE | DU-PONT1 | DUPONT2 | CONTROL | ISOLATE |
|---|---|---|---|---|
| APPEARANCE | 6 | 6 | 6 | 6.25 |
| FLAVOR | 4 | 3.5 | 3.5 | 3 |
| TEXTURE-MOUTHFEEL | 4.25 | 5 | 4.75 | 3.25 |
| EMULSION STABILITY | 7 | 7 | 7 | 7 |

EXAMPLE 4

MANUFACTURE OF A SOY-BASED WEIGHT LOSS/MEAL REPLACEMENT BEVERAGE

This example illustrates using the novel soy protein product of the present invention compared to a commercial soy protein isolate and concentrate to prepare a soy-based weight loss/meal replacement beverage powder without flavor, vitamins, minerals, and trace nutrients.

The ingredients used and the formula for preparation of the nutritional beverage are presented in Table 13, and the procedure used is given below.

TABLE 13

FORMULA FOR A SOY-BASED WEIGHT LOSS/MEAL
REPLACEMENT BEVERAGE WITHOUT VITAMINS,
MINERALS, OR TRACE NUTRIENTS

| INGREDIENT | ISOLATE BASED FORMULA, % | CONCENTRATE BASED FORMULA, % | NOVEL BASED FORMULA, % |
|---|---|---|---|
| Sweet Dairy Whey | 50.0 | 50.0 | 47.0 |
| Powdered Cellulose | 7.0 | — | 7.0 |

TABLE 13-continued

FORMULA FOR A SOY-BASED WEIGHT LOSS/MEAL
REPLACEMENT BEVERAGE WITHOUT VITAMINS,
MINERALS, OR TRACE NUTRIENTS

| INGREDIENT | ISOLATE BASED FORMULA, % | CONCENTRATE BASED FORMULA, % | NOVEL BASED FORMULA, % |
|---|---|---|---|
| Soy Protein Product (isolate-conc.-novel) | 35.0 | 44.0 | 46.0 |
| Sucrose | 6.0 | 6.0 | — |

All ingredients were dry blended in a simple ribbon blender. The soy-based weight loss beverages were evaluated using a 7-point hedonic scale as discussed above and the results of the product comparisons are summarized in Table 14. The novel protein samples had a significant improvement in product solubility when compared to the concentrate and isolate samples which did not solubilize and separated when reconstituted in water. The DUPONT samples were slightly better in flavor and mouthfeel than the commercial isolate and concentrate. All novel samples were 2.4 to 4.4 times greater than the commercial isolate and 39 to 70 times greater than the commercial concentrate.

TABLE 14

EVALUATION INFORMATION FOR SOY-
BASED WEIGHT LOSS BEVERAGE

| ATTRIBUTE | DU-PONT1 | DU-PONT2 | CON-TROL | ISOLATE | CONCEN-TRATE |
|---|---|---|---|---|---|
| APPEARANCE | 1.5 | 1.5 | 1.5 | 1.5 | 1.25 |
| FLAVOR | 2.75 | 2.5 | 2.5 | 2.25 | 2.25 |
| TEXTURE-MOUTHFEEL | 3.25 | 3.25 | 3.25 | 2.5 | 2.75 |
| SOLUBILITY | 4.25 | 4.75 | 4.5 | 1 | 1 |
| MILLIGRAMS ISOFLAVONES PER 30 GRAM SERVING | 39 | 70 | 42 | 16 | 1 |

EXAMPLE 5

MANUFACTURE OF A SOY-BASED
IMITATION PROCESSED CHEESE SPREAD

This example illustrates using the novel soy protein product of the present invention compared to a commercial isolate to prepare a soy-based imitation processed cheese spread.

The ingredients and formulations used in the preparation of this imitation processed cheese spread are given in Table 15, and the procedure to make the spread is given below.

TABLE 15

FORMULA FOR A SOY-BASED IMITATION
PROCESSED CHEESE SPREAD

| INGREDIENT | ISOLATE BASED FORMULA (% dry matter) | NOVEL BASED FORMULA (% dry matter) |
|---|---|---|
| Soy Product (isolate/novel) | 4.25 | 5.50 |
| Rennet Casein | 12.75 | 12.75 |
| Vegetable Oil | 23.00 | 23.00 |
| Sodium Citrate | 0.50 | 0.50 |

TABLE 15-continued

FORMULA FOR A SOY-BASED IMITATION
PROCESSED CHEESE SPREAD

| INGREDIENT | ISOLATE BASED FORMULA (% dry matter) | NOVEL BASED FORMULA (% dry matter) |
|---|---|---|
| Disodium Phosphate | 1.00 | 1.00 |
| Sodium Aluminum Phosphate | 0.50 | 0.50 |
| Whey Powder | 2.75 | 1.25 |
| Lactic Acid | 0.50 | 0.50 |
| Water | 55.25 | 55.00 |

Rennet casein, novel soy protein product, and whey were blended together thoroughly. The oil was added to a processed cheese cooker at 66° C. with disodium phosphate, sodium citrate, sodium aluminum phosphate, and flavor. Water was added to the oils and salt at 66° C. and the dry blend was added slowly. Lactic acid was added slowly and the mixture was heated to 85° C. for 30–60 sec. The imitation processed cheese spread was then packaged and cooled. The imitation processed cheese spreads were evaluated using a 7-point hedonic scale as discussed above and the results of the product comparisons are summarized in Table 16. The DUPONT 1 sample performed with roughly equal performance as the commercial isolate while the DUPONT 2 and CONTROL samples were inferior to the isolate.

TABLE 16

EVALUATION INFORMATION FOR SOY-
BASED PROCESSED CHEESE SPREAD

| ATTRIBUTE | DU-PONT1 | DUPONT2 | CONTROL | ISOLATE |
|---|---|---|---|---|
| APPEARANCE | 4 | 3 | 2.75 | 4.75 |
| FLAVOR | 3.25 | 2 | 2.25 | 3.5 |
| TEXTURE-MOUTHFEEL | 3.5 | 2.75 | 2.25 | 3.75 |
| SLICEABILITY | 4.25 | 3.75 | 3 | 4.5 |
| MELTABILITY | 4.25 | 3.5 | 3.5 | 4 |

EXAMPLE 6

MANUFACTURE OF A SOY-EXTENDED
WATER-INJECTED HAM

This example illustrates using the novel soy protein product compared to a commercial soy isolate in making soy-extended, water-injected ham. The formula and ingredients used are summarized in Table 17, and the process utilized is given below.

TABLE 17

FORMULA FOR A SOY-EXTENDED, WATER-INJECTED HAM

| INGREDIENT | ISOLATE BASED FORMULA, % | NOVEL BASED FORMULA, % |
|---|---|---|
| Water | 83.00 | 80.60 |
| Soy Protein Product (isolate/novel) | 8.00 | 11.20 |
| Salt | 6.00 | 6.00 |
| Sodium Tripolyphosphate | 1.20 | 1.20 |
| Ham Spice | 0.80 | 0.80 |
| Brown Sugar | 0.42 | — |
| Cane Sugar | 0.40 | — |

TABLE 17-continued

FORMULA FOR A SOY-EXTENDED, WATER-INJECTED HAM

| INGREDIENT | ISOLATE BASED FORMULA, % | NOVEL BASED FORMULA, % |
|---|---|---|
| Sodium Erythrobate | 0.13 | 0.13 |
| Sodium Nitrate | 0.04 | 0.04 |

Process Sequence: Debone, inject, massage, stuff, and smokehouse cook.

The soy product was dispersed in water with a conventional type brine mixer. After soy product was completely dispersed, the sodium tripolyphosphate was added and mixed until completely dissolved with the remaining ingredients. The hams were injected to 150% of green weight of the ham with the above brine. (Green weight is the raw weight of the ham prior to injection). The deboned hams were cut to size to prevent tearing. The pumped ham was placed into a massager and processed for 4 hours under 635 mm mercury vacuum. The hams were then stuffed into fibrous casings and cooked to 67° C.

Process/Cooking Schedule

1 Hour 54° C. @ 35% Relative Humidity
1 Hour 60° C. @ 35% Relative Humidity
1 Hour 71° C. @ 40% Relative Humidity
Finish at: 82° C. until 67°–68° C. with 50% Relative Humidity The product was then cold showered to an internal temperature of 32° C. and chilled overnight to packing temperatures 3.3° C. The soy-extended, water-injected hams were evaluated using a 7-point hedonic scale as discussed above and the results of the product comparisons are summarized in Table 18. All samples worked well in respect to yield of the hams. DUPONT 1 had the lowest amount of free liquid and lowest loss from smokehouse to final product. It also had improved sliceability compared to the isolate sample as well as slightly improved flavor.

TABLE 18

EVALUATION FOR SOY-INJECTED COMBINATION HAM PRODUCT

| ATTRIBUTE | DUPONT1 | DUPONT2 | CONTROL | ISOLATE |
|---|---|---|---|---|
| APPEARANCE | 5.5 | 5.5 | 5.5 | 5.5 |
| FLAVOR | 5 | 4 | 4.5 | 4.5 |
| TEXTURE-MOUTHFEEL | 4 | 4 | 4 | 4 |
| SLICEABILITY | 6 | 5 | 5 | 5 |
| YIELD % | 117 | 116 | 114 | 116 |
| % GRN WT TO SMOKEHOUSE | 125 | 127 | 126 | 126 |
| FREE LIQUID RANK 1 = LEAST | 1 | 4 | 3 | 2 |

EXAMPLE 7

MANUFACTURE OF A SOY EXTENDED BOLOGNA

This example illustrates using the novel soy protein product compared to a commercial isolate and concentrate in making a soy extended bologna. The formula and ingredients are given in Table 19 and the process observed was as follows:

TABLE 19

FORMULA FOR A SOY-EXTENDED BOLOGNA PRODUCT

| INGREDIENT | ISOLATE BASED FORMULA, % | CONC. or NOVEL BASED FORMULA, % |
|---|---|---|
| Pork Skinned Jowles | 3.03 | 3.03 |
| Pork 72/28 Trim | 44.61 | 44.61 |
| Beef 50% Trim | 20.42 | 20.42 |
| Water | 19.96 | 19.96 |
| Salt | 2.43 | 2.43 |
| Dextrose | 2.00 | 2.00 |
| #1 Ground Mustard | 0.90 | 0.90 |
| Spice | 1.00 | 1.00 |
| Sodium Tripolyphosphate | 0.44 | 0.44 |
| Sodium Erythrobate | 0.44 | 0.44 |
| Cure Compd.-6.25 Sodium Nitrate | 0.17 | 0.17 |
| Soy Protein Product (isolate, concentrate or novel) | 2.28 | 3.00 |
| Corn Syrup Solids 42 Dextrose Equivalents | 2.72 | 2.00 |

Lean meats were ground to 5 mm and fat (>30%) meats were ground to 10 mm. These ingredients were added to a conventional meat chopper in the following order: I) lean meats, 2) sodium tripolyphosphate, 3) ¼ water, 4) salt, and 5) ½ water. The mixture was chopped until tacky. The following ingredients were added to the tacky mixture in this order: 1) novel soy protein product, 2) fat meats, 3) balance of water, and 4) balance of dry ingredients. The mixture was then placed in a conventional emulsified meat cooker with the following cooking procedure:

1 Hour 60° C. @ 30% Relative Humidity
2.5 Hours 71° C. @ 35% Relative Humidity
Finish at: 82° C. until internal meat temperature is 70° C.

The product was then cooled, cut and packaged.

The soy-extended bologna products were evaluated using a 7-point hedonic scale as discussed above and the results of the product comparisons are summarized in Table 20. All products performed equally well in emulsifying the fat and maintaining product yield. The DUPONT 1 sample performed slightly better than the isolate in flavor, texture, and appearance, but significantly better than the concentrate in the same categories. The CONTROL was significantly worse than all samples except the concentrate.

TABLE 20

EVALUATION FOR SOY-EXTENDED BOLOGNA

| ATTRIBUTE | DUPONT1 | DUPONT2 | CONTROL | ISOLATE | CONCENTRATE |
|---|---|---|---|---|---|
| APPEARANCE | 6 | 5.75 | 6 | 5.5 | 6 |
| FLAVOR | 5.25 | 4.75 | 4.25 | 5 | 4 |
| TEXTURE-MOUTHFEEL | 5.25 | 5.25 | 4.75 | 5 | 3.75 |
| SLICEABILITY | 7 | 7 | 7 | 7 | 7 |
| YIELD % | 97 | 97 | 97 | 96 | 97 |

EXAMPLE 8

MANUFACTURE OF A SOY-BASED FROZEN DESSERT AND YOGURT

This example illustrates how a frozen desert and a yogurt can be made using the novel soy protein product of the present invention. The ingredients and formula are identified in Tables 21 and 22, and the makeup procedures follow.

TABLE 21

FORMULA FOR A SOY-BASED FROZEN DESERT WITHOUT FLAVOR VITAMINS, MINERALS, AND TRACE ELEMENTS

| INGREDIENT | FORMULA (% dry matter) |
|---|---|
| Water | 61.25 |
| Hydrogenated Soybean Oil | 10.00 |
| Novel Soy Protein Product | 12.00 |
| Corn Syrup Solids 42 Dextrose Equivalent | 6.00 |
| Sucrose | 10.00 |
| Stabilizer Blend | 0.75 |
| STABILIZER BLENDING | |
| Cellulose Gum | 72.45 |
| Carboxymethyl Cellulose | 8.70 |
| Locust Bean Gum | 7.25 |
| Xanthan Gum | 5.80 |
| Xanthan Gum | 2.90 |
| Carrageenan | 2.90 |

All dry ingredients are blended and added to the water at 54° C. under sufficient agitation. The hydrogenated soybean oil is added under the same agitation until thoroughly mixed. The solution is pasteurized at 78° C. for 20 sec and homogenized at 100/33 bar. The mixture is frozen with 70 to 100% overrun and is then packaged to harden.

TABLE 22

FORMULA FOR A SOY-BASED WHOLE MILK REPLACER YOGURT WITHOUT VITAMINS, MINERALS, AND TRACE ELEMENTS

| INGREDIENT | FORMULA, % |
|---|---|
| Sweet Dairy Whey | 34.5 |
| Novel Soy Protein Product | 33.5 |
| Vegetable Oil | 26.2 |
| Sugar | 3.0 |
| Emulsifiers | 1.5 |
| Salts, Vitamins, Minerals | 1.0 |
| Flavoring | 0.5 |

All oils for the tests are combined in a separate tank and heated to 66° C., and then the emulsifiers are added. The soy product is stirred into water at 49° C. with adequate agitation to solubilize at 18% solids. Neutrase enzyme at 0.1% of protein weight is added under constant agitation for one hour to hydrolyze the protein in the soy solution. The solution is pasteurized after an hour to stop the reaction by denaturing the enzyme. The whey, sugar, salts, minerals, and flavors are added and blended for 15 minutes before the oil with emulsifiers is added. After the entire mixture is blended for 15 minutes more it is pasteurized and spray dried. The soy milk replacer is reconstituted to 14% total solids. A 2% yogurt starter culture is innoculated at a temperature of 35° C. The temperature is maintained at 35° C. until the pH reached 4.6 when the culture is broken by cooling to 4° C.

What is claimed is:

1. An isoflavone-enriched soy protein product having:
   protein content greater than 60% of total dry matter;
   total dietary fiber content less than 4% of total dry matter;
   sucrose content greater than 10% of total dry matter;
   total sulfur-containing amino acid content greater than 2.2% of total amino acid content;
   stachyose content less than 1.5% of total dry matter; and
   total isoflavone content greater than 2500 micrograms/gram of total dry matter.

2. A liquid or powdered milk replacer product which utilizes the product of claim 1 as an ingredient in the product formula at a formula percentage of 20–60% on a dry weight basis.

3. A liquid or powdered soy-based infant formula which utilizes the product of claim 1 as an ingredient in the formula at a formula percentage of 7–21% on a dry weight basis.

4. A soy-based nutritional beverage powder or liquid which utilizes the product of claim 1 as an ingredient in a formula at a formula percentage of 10–100% on a dry weight basis.

5. An imitation processed cheese spread which utilizes the product of claim I as an ingredient in the spread formulation at 10–50% of the protein used in the formula.

6. A water-injected combination ham product which utilizes the product of claim 1 as an ingredient in the combination ham formulation at a percentage of 2.5–10% of the raw weight of the ham prior to water injection.

7. A soy extended bologna which utilizes the product of claim 1 as an ingredient in the formulation at a percentage of 2–6% formula basis.

8. A soy-extended yogurt product which utilizes the product of claim 1 as an ingredient in the formulation at a formula percentage of 20–60% on a dry weight basis.

9. A soy-based frozen dessert which utilizes the product of claim 1 as an ingredient in the dessert formulation at a formula percentage of 5–20%.

10. A method for the manufacture of an isoflavone-enriched soy protein product comprising:
   (a) preparing soyflour or flakes from soybeans wherein the soyflour or flakes have a stachyose content less than 2.0% of total dry matter, a sucrose content greater than 9.0% of total dry matter and a total isoflavone content greater than 2000 micrograms per gram of total dry matter;
   (b) contacting the material from (a) with a solvent to preferentially remove the dietary fiber;
   (c) collecting the soluble material from (b) by centrifugation or other equivalent physical means; and
   (d) drying the soluble material from (c) to an appropriate level of moisture to allow for optimum handling and subsequent use of the soy protein product.

11. The method of claim 10 wherein the soy protein product is manufactured from soy flour having a stachyose content of less than 0.5% of total dry matter, and a sucrose content greater than 12.5% of total dry matter.

* * * * *

US005858449B1

REEXAMINATION CERTIFICATE (4197th)

United States Patent [19]
Crank et al.

[11] B1 5,858,449
[45] Certificate Issued Nov. 7, 2000

[54] ISOFLAVONE-ENRICHED SOY PROTEIN PRODUCT AND METHOD FOR ITS MANUFACTURE

[75] Inventors: Donald Lee Crank, Alexandria, Minn.; Phillip Scott Kerr, Urbandale, Iowa

[73] Assignee: E.I. du Pont de Nemours and Company, Wilmington, Del.

Reexamination Request:
No. 90/005,629, Feb. 2, 2000

Reexamination Certificate for:
Patent No.: 5,858,449
Issued: Jan. 12, 1999
Appl. No.: 08/913,180
Filed: Sep. 9, 1997

[22] PCT Filed: Apr. 8, 1997
[86] PCT No.: PCT/US97/05724
§ 371 Date: Sep. 9, 1997
§ 102(e) Date: Sep. 9, 1997
[87] PCT Pub. No.: WO97/37547
PCT Pub. Date: Oct. 16, 1997

Related U.S. Application Data
[60] Provisional application No. 60/015,052, Apr. 9, 1996.

[51] Int. Cl.[7] .................................................. A23J 1/00
[52] U.S. Cl. ......................... 426/656; 426/634; 426/629; 426/443; 426/431
[58] Field of Search ................................... 426/656, 634, 426/629, 443, 431; 530/378

[56] References Cited

U.S. PATENT DOCUMENTS

| | | | |
|---|---|---|---|
| 5,516,528 | 5/1996 | Hughes et al. | 424/464 |
| 5,830,887 | 11/1998 | Kelly | 514/182 |
| 5,936,069 | 8/1999 | Johnson | 530/378 |

OTHER PUBLICATIONS

Price, K. R. et al., Naturally occurring oestrogens in foods—A review, *Food Additives and Contaminants*, 2(2), 73–98, 1985.

Wang, Huei–ju et al., Isoflavone Content in Commercial Soybean Foods, *J. Agric. Food Chem.*, 42(8), 1666–1673, 1994.

Coward, Lori et al., Genistein, Daidzein, and Their β–Glycoside Conjugates: Antitumor Isoflavones in Soybean Foods from American and Asian Diets, *J. of Agric. and Food Chem.*, 41(11), 1961–1967, 1993.

*Primary Examiner*—N. Bhat

[57] ABSTRACT

This invention relates to a novel isoflavone-enriched soy protein product and a method used for its manufacture. The finished soy protein product displays desirable flavor and functional properties, and its isoflavone content is substantially increased compared to traditional soy protein concentrates and isolates. In addition the total sulfur containing amino acid content is improved compared to soy protein isolates. The method for the manufacture of the novel soy protein product results in improved yield and reduced waste products compared to those used to manufacture soy protein concentrates and isolates. The novel soy protein product displays desirable flavor, composition, and performance as an ingredient in the production of dairy or meat based food products such as infant formula, nutritional beverage, milk replacer, soy extended bologna, imitation processed cheese spread, water-injected ham, yogurt and frozen dessert.

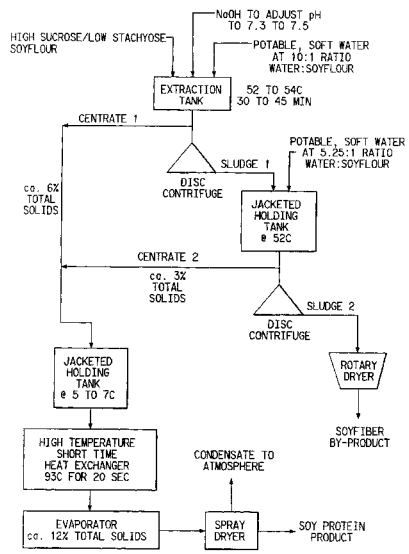

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *